UNITED STATES PATENT OFFICE.

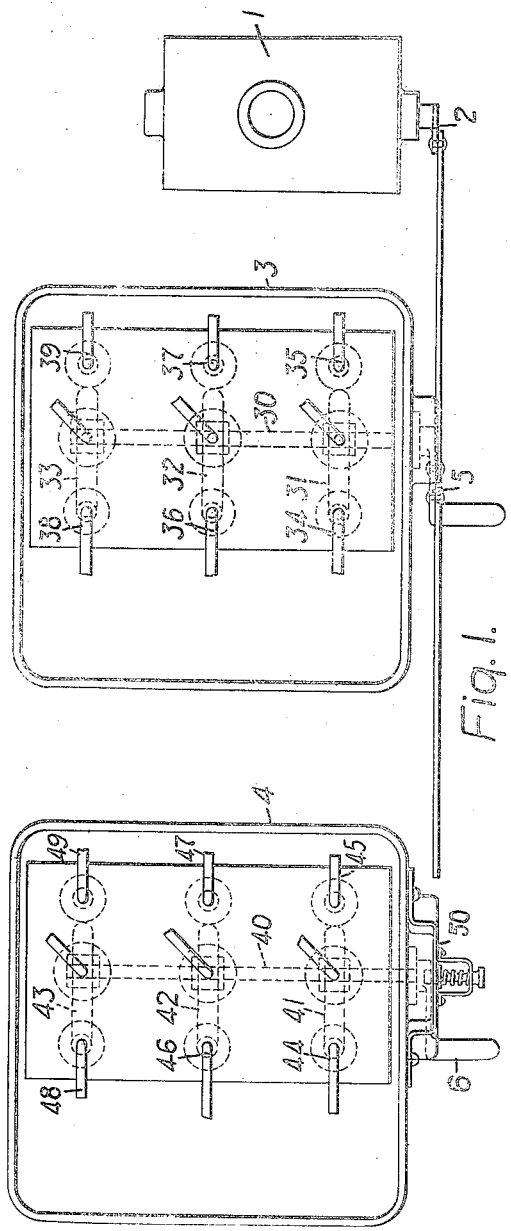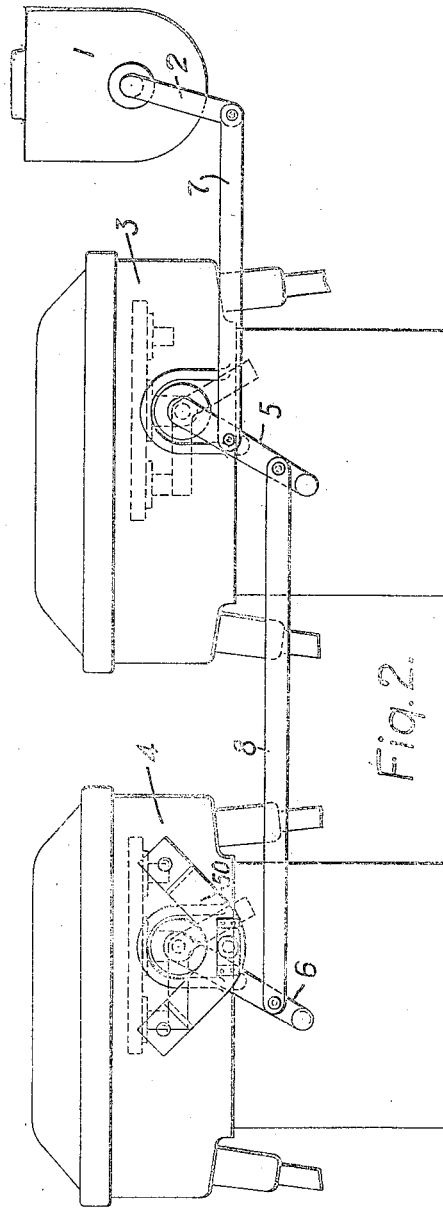

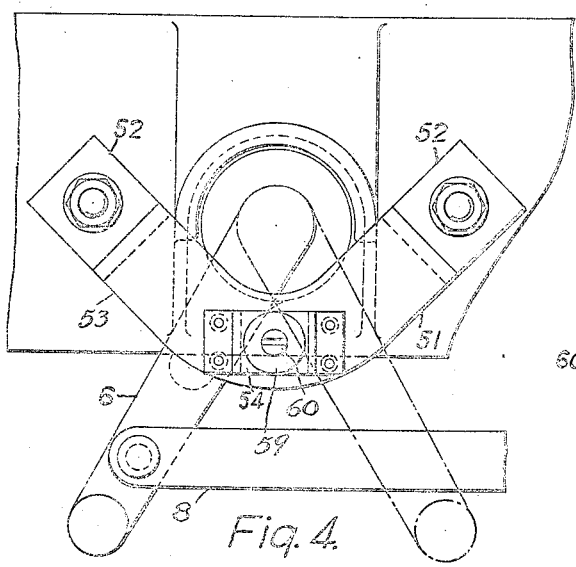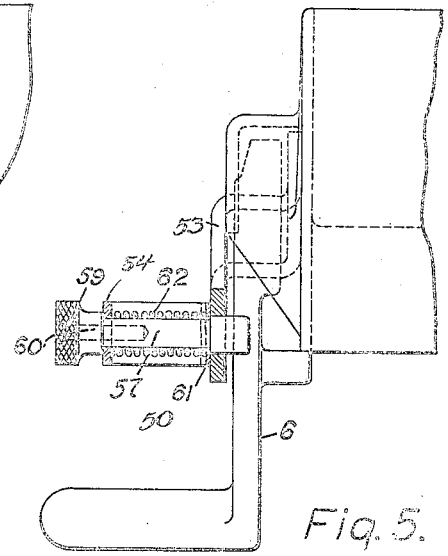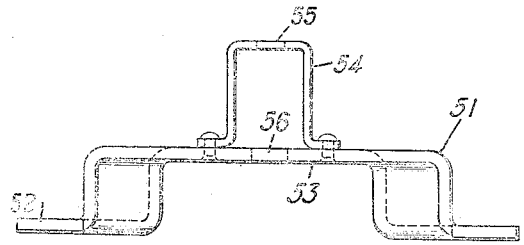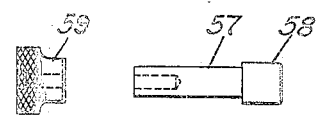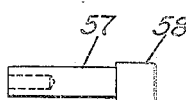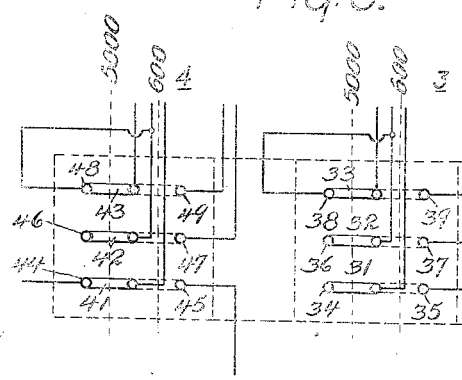

FREDERICK G. HICKLING, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,324,819.   Specification of Letters Patent.   Patented Dec. 16, 1919.

Application filed December 8, 1915. Serial No. 65,776.

*To all whom it may concern:*

Be it known that I, FREDERICK G. HICKLING, a citizen of the United States, and a resident of Wilkinsburg, in the county of Allegheny and State of Pennsylvania, have invented a new and useful Improvement in Control Apparatus, of which the following is a specification.

My invention relates to control apparatus for control systems wherein the control apparatus is adapted to be connected to sources of power having different voltages and to sources of either direct or alternating current.

One object of my invention is to provide control apparatus of the above indicated character that shall prepare the power and control circuits of a control system for operation from various sources of power.

Another object of my invention is to provide control apparatus of the above indicated class with a controller or change-over switch for preparing the control circuits and with switches for preparing the power circuits of a control system.

A further object of my invention is to provide control apparatus having a controller and switches with connecting means, whereby the controller and switches will operate simultaneously and with means for locking the same in their operated positions.

More specifically, my invention involves control apparatus for preparing a control system to operate from a source of power of either high or low voltage or from a source of either direct or alternating current and embodies a drum controller or change-over switch which is connected to the control circuits and oil switches which are connected to the power circuits. The controller and the oil switches are provided with operating handles which are connected by links so that any one handle may be used to operate the controller and switches simultaneously. One of the operating handles is provided with locking means for holding the controller and switches in an operated position.

In the accompanying drawings illustrating my invention, Figure 1 is a diagrammatic plan view and Fig. 2 is an elevation of a controller and two oil switches constructed in accordance with my invention; Fig. 3 is a diagrammatic view of the control and power circuits connected to the controller and switches; Fig. 4 is a plan view and Fig. 5 is an elevational view partially in section of a locking device attached to one of the switch handles; and Figs. 6, 7 and 8 are detail views of the locking device.

Referring to the drawing, a drum controller or change-over switch 1, which is provided with an operating handle 2, is connected to the control circuits of a control system, and oil switches 3 and 4, which are provided with operating handles 5 and 6, are connected to the power circuits of the control system. The operating handles 2 and 5 are pivotally connected to a lever arm 7, and operating handles 5 and 6 are pivotally connected to a lever arm 8. The pivotal connection between the handle 2 and the arm 7 is at a greater distance from the center of rotation of the handle 2 than the pivotal connection between the arm 7 and the handle 5 is from the center of rotation of the arm 5, in order that the handle 5 may be moved through a greater angle than the arm 2. The pivotal connection between the arm 8 and the handle 5 and the pivotal connection between the arm 8 and the handle 6 are located at equal distances from the centers of rotation of the arms 5 and 6 in order that the handles 5 and 6 may move through like angles.

The controller or change-over switch 1, in the example shown, embodies stationary contact fingers 9 to 22, inclusive (see Fig. 3), movable contact segments 23 and 24 which are adapted to engage contact fingers 10 and 11 and 21 and 22, respectively, when the controller is moved to prepare the control system for operation at 5000 volts, and movable contact segments 25, 26, 27, 28 and 29 which are adapted to engage the contact fingers 9 to 20, inclusive, in case the controller is moved to prepare the control system for operation at 600 volts.

In illustrating my invention, power circuits of 5000 and 600 volts are shown connected to the oil switches, but my invention is not necessarily limited to the above power circuits, as the same may be used for combining a control system with power circuits of different voltages or with DC and AC power circuits.

The switch 3, which has been illustrated as an oil switch, embodies a rotatable shaft 30 having pairs of switch blades 31, 32 and 33 mounted thereon which are adapted to coöperate with contact terminals 34, 35, 36, 37, 38 and 39. The switch handle 5, which is mounted on one end of the shaft 30, controls the operation of the switch. The switch 4 embodies a rotatable shaft 40 having pairs of contact blades 41, 42 and 43 mounted thereon which are adapted to engage contact terminals 44 to 49, inclusive. The switch handle 6 is mounted on one end of the shaft 40 to control its operation.

A locking device 50 is mounted upon the switch 4 for holding the switch handle 6 in the one or the other of its operated positions. The locking device embodies a semi-elliptical arm 51 having the ends 52 thereof offset for attaching the same to the switch 4 and also to form a yoke portion 53 between the offset portions. Mounted upon the yoke portion 53, is a second yoke 54 having an opening 55 in the center thereof that is alined with an opening 56 of a greater diameter in the yoke portion 53. A pin 57 is provided with a body portion which is adapted to pass through the opening 55 and an enlarged head 58 which is adapted to pass through the opening 56 in the yoke portion 53. The pin 57 is mounted upon the yokes 54 and 53 with one end of the body portion disposed within the opening 55 and the enlarged head 58 projecting through the yoke portion 53. The pin 57 is supported upon the yoke 54 by means of a head 59 and a screw 60. A washer 61 is placed upon the pin 57 in contact with the enlarged head 58 and a spring 62 is disposed on the pin intermediate the washer 61 and the yoke 55 for forcing the pin 57 into its lower position.

It will be understood by those skilled in the art that the illustrated devices are entirely of the familiar "change-over" type and perform no functions other than preparing the governed control system for operation from the one or the other source of energy. The subsequent control of the system may be effected in any suitable and well-known manner by the other usual controllers, which I have not deemed it necessary to show or describe in the exposition of my present invention.

The control apparatus illustrating my invention is provided with two operating positions, one for connecting the control system to a 5000-volt circuit and a second position for connecting the control system to a 600-volt circuit. In case the arms 2, 5 and 6 are moved to the left, as shown in solid lines, controller segments 23 and 24 effect engagement with the contact fingers 10 and 11 and 21 and 22; switch blades 31, 32 and 33 of the switch 3 effect engagement with the contact terminals 34, 36 and 38 which are connected to a 5000-volt circuit and switch blades 41, 42 and 43 of switch 4 effect engagement with the contact terminals 44, 46 and 48 which are connected to the 5000-volt circuit. Thus, the change-over control apparatus is connected for operating the control system from the 5000-volt source of power.

In case it is desired to operate the control system from a 600-volt circuit, the switch handles 2, 5 and 6 are moved to the right (partially shown in dotted lines), whereby controller segment 25 engages contact fingers 9 and 10, controller segment 26 engages contact fingers 11, 12 and 13, controller segment 27 engages contact fingers 14 and 15, controller segment 28 engages contact fingers 16 and 17 and controller segment 29 engages contact fingers 18, 19 and 20. The switch blades 31, 32 and 33 of the oil switch 3 effect engagement with contact terminals 35, 37 and 39 which are connected to a 600-volt circuit, and switch blades 41, 42 and 43 of the switch 4 effect engagement with contact terminals 45, 47 and 49 which are connected to the 600 volt circuit. It should be noted that in case the switch handle 6 is moved to its extreme left or to its extreme right position, the head 58 upon the pin 57 will lock the same so as to prevent any return movement thereof, and before the control apparatus can be moved to another position the arm 6 must be released from the pin 57 by manually raising this pin against the tension of the spring 62.

Various modifications in the apparatus and improvements in the operation thereof may be effected without departing from the spirit and scope of my invention, and I desire, therefore, that only such limitations shall be imposed as are indicated in the appended claims.

I claim as my invention:

1. In control apparatus for a multi-voltage control system, a controller, switches, means for simultaneously moving said controller and said switches to prepare the system for operation at any desired voltage, and resilient means independent of the first-named means for locking the same to hold said controller and said switches in operated position.

2. In control apparatus for a control system, the combination with a controller and an operating handle therefor, a plurality of switches, operating handles for said switches, and lever arms joining the operating handles of said controller and said switches, of a spring-operated pin attached to one of said switches for locking the operating handles in operated position.

3. In control apparatus for a multi-voltage control system having power and control circuits, the combination with a change-over switch for governing the control circuits and switches for governing the power circuits, of means for simultaneously operating all of said switches to prepare the system for operation at the desired voltage, and means attached to one of said switches and independent of said operating means for locking them in operated position.

4. In control apparatus for a control system, the combination with a controller and an operating handle therefor, of switches, handles for operating said switches, levers for joining the operating handles of said controller and said switches, and means independent of said handles and levers for locking the handles of said controller and said switches in case the same are moved to the right or to the left.

5. In control apparatus for a two-voltage control system having power and control circuits, the combination with a controller connected to the control circuits and switches connected to the power circuits, of operating handles for said controller and said switches, and links for connecting said handles to each other, whereby all handles may be moved simultaneously in one direction to prepare the control and power circuits for operation at one voltage and whereby the same may be moved in the opposite direction to prepare the control and power circuits for operation at another voltage.

6. In control apparatus for a combined high and low-voltage control system having power and control circuits, the combination with a controller for controlling the connections to the control circuits, and switches electrically connected to the power circuits, of means for operating said controller and said switches in one direction to prepare the power and control circuits of the low-voltage portion of the system and for operating the same in the opposite direction to prepare the power and control circuits of the high-voltage portion of the system.

7. In control apparatus, the combination with a drum controller, a handle for said drum controller, a plurality of switches having two sets of contact terminals and rotatable contact blades for effecting engagement with said terminals, and arms for rotating said contact blades, of means for mechanically joining the arms of said controller and said switches, whereby the same may be operated simultaneously.

8. In control apparatus for a combined high and low-voltage control system having power and control circuits, the combination with a drum controller connected to the control circuits, an operating arm for said controller, a plurality of oil switches connected to the power circuits each of which comprises two sets of contact terminals connected respectively to the high and low-voltage power circuits and rotatable contact blades for effecting contact with said terminals, and arms for rotating said contact blades, of lever arms for joining the arms of said switches and said controller, whereby the same may be operated simultaneously for preparing the control system to operate at a high or a low voltage.

9. In control apparatus for a control system adapted to be connected to either of two sources of electric energy, a controller for connecting said system to one or the other of said sources, switches for controlling said system in accordance with the position of said controller and means for preventing the operation of said controller unless said switches are operated simultaneously therewith.

10. The combination of a pair of rotatable switches, an arm for each of said switches and rotatable therewith and a link connecting said arms at different distances from said switches, whereby one of said switches may be moved through a greater angular distance than said other switch.

11. The combination with a switch, of locking means therefor, said means comprising an arm having two yoke portions provided with alined openings, a spring-pressed pin slidably mounted in said openings and a member connected to said switch adapted to be operatively engaged by said pin.

In testimony whereof I have hereunto subscribed my name this 30th day of Nov. 1915.

FREDERICK G. HICKLING.